US008670780B2

(12) United States Patent
Hakola et al.

(10) Patent No.: US 8,670,780 B2
(45) Date of Patent: Mar. 11, 2014

(54) METHOD AND APPARATUS FOR ESTABLISHING AN INTRA-SYSTEM INTERFACE WITHIN AN UNLICENSED SPECTRUM

(75) Inventors: Sami-Jukka Hakola, Kempele (FI); Timo Koskela, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 155 days.

(21) Appl. No.: 13/183,940

(22) Filed: Jul. 15, 2011

(65) Prior Publication Data

US 2013/0017837 A1    Jan. 17, 2013

(51) Int. Cl.
*H04W 72/00*    (2009.01)
(52) U.S. Cl.
USPC ............ 455/454; 455/446; 455/447; 455/448
(58) Field of Classification Search
USPC ......................................... 455/454, 446–448
See application file for complete search history.

(56) References Cited

U.S. PATENT DOCUMENTS

| 7,821,964 | B2 * | 10/2010 | Ayyagari et al. ............... 370/254 |
| 2003/0119548 | A1 | 6/2003 | Mohammed |
| 2005/0090264 | A1 * | 4/2005 | Kim ................................ 455/455 |
| 2006/0223497 | A1 | 10/2006 | Gallagher et al. |
| 2007/0041360 | A1 | 2/2007 | Gallagher et al. |
| 2010/0022250 | A1 * | 1/2010 | Petrovic et al. ................ 455/450 |
| 2010/0034153 | A1 * | 2/2010 | Lee et al. ........................ 370/329 |
| 2010/0291934 | A1 * | 11/2010 | Lopes ............................ 455/446 |
| 2011/0143743 | A1 * | 6/2011 | Pollakowski et al. ......... 455/422.1 |
| 2011/0286401 | A1 * | 11/2011 | Wijting et al. ................. 370/329 |
| 2012/0106461 | A1 * | 5/2012 | Kasslin et al. ................. 370/329 |

FOREIGN PATENT DOCUMENTS

| GB | 2 444 997 A | 6/2008 |
| WO | WO-2004/036770 A2 | 4/2004 |

OTHER PUBLICATIONS

Hyunduk Kang et al: "System description and reference model proposal; IEEE Draft;19-10-0113-00-0001-system-description-and-reference-model-proposal"; Sep. 6, 2010 ; XP017661526, vol. 802.19.1; pp. 1-52.*
Baykas, T., et al.; "*IIEEE P802.19 Wireless Coexistence—System Design* Document;" IEEE 802.19; doc.: IEEE 802.19-10/0055r3; dated Mar. 2010; originally retrieved from <http://ieee802.org/19/pub/TG1.html>.
Kasslin, M., et al.; "*Coexistence architecture of 802.19.1;*" IEEE 802.19; doc.: IEEE 802.19-10/0013r0; dated Jan. 19, 2010.

(Continued)

*Primary Examiner* — Liton Miah
(74) *Attorney, Agent, or Firm* — Alston & Bird LLP (57) ABSTRACT

A method and apparatus are provided for facilitating the creation of an intra-system interface between systems operating in an unlicensed spectrum, such as between respective access points of first and second LTE systems that use the same radio resources within an unlicensed spectrum, such as within the TV white spaces. In the context of a method, configuration messages may be caused to be sent to first and second systems regarding creation of an intra-system interface. The method may also receive configuration message responses including address information for first and second access points of the first and second systems, respectively. The method may additionally cause a message to be sent to the first system to trigger the first system to initiate establishment of the intra-system interface with the second system.

20 Claims, 6 Drawing Sheets

(56) References Cited

OTHER PUBLICATIONS

Phan, M-A, et al.; "*Flexible Spectrum Usage—How LTE Can Meet Future Capacity Demands*;" Ericsson Research; dated Jul. 8, 2010; originally retrieved from <http://www.ikr.uni-stuttgart.de/Content/itg/fg524/Meetings/2010-07-08-Heidelberg/03_ITG524_Heidelberg_Sachs.pdf>.

Sesia, S., et al.; "*LTE, The UMTS Long Term Evolution: From Theory to Practice*;" Wiley; dated Feb. 2009.

Yang, R.; "*Overview of Research Projects with NYU-Poly*;" InterDigital Communications, LLC; dated Nov. 12, 2010; originally retrieved from <http://catt.poly.edu/content/researchreview10/OverviewOfResearchProjectswithNYU-Poly.pdf>.

"*Network Sharing—Architecture and functional descrption*;" 3GPP TS 23.251 V10.2.0; 3rd Generation Partnership Project, Technical Specification Group Services and System Aspects; dated Jun. 2011; retrieved on Jun. 20, 2013 from <http://www.3gpp.org/ftp/Specs/2011-06/Rel-10/23_series/>.

Search Report for United Kingdom Application No. GB 1112153.0; dated Nov. 14, 2011.

* cited by examiner

METHOD AND APPARATUS FOR ESTABLISHING AN INTRA-SYSTEM INTERFACE WITHIN AN UNLICENSED SPECTRUM

TECHNOLOGICAL FIELD

Embodiments of the present invention relate generally to methods and apparatus for utilizing an unlicensed spectrum and, more particularly, to methods and apparatus for establishing an intra-system interface between different systems within the unlicensed spectrum.

BACKGROUND

Within the licensed spectrum, increased data traffic has caused operators to consider alternative solutions by which at least some of the traffic is off-loaded to local nodes that provide local access to the Internet or other networks so as to reduce congestion of the core network. For example, femtocells operating in the licensed spectrum may service local nodes and may facilitate local access to the Internet or other networks. However, data traffic is anticipated to continue to increase and, as such, operators are continuing to seek other options for off-loading traffic from the core network.

In this regard, operators are considering utilization of the unlicensed spectrum (also referenced as the shared spectrum) in order to support at least some of the data traffic. While various shared bands have been defined within the unlicensed spectrum, examples include the industrial, scientific and medical (ISM) band and TV white spaces (TVWS). In order to coordinate spectrum usage, such as the usage of TV white spaces, a coexistence manager is being developed pursuant to IEEE 802.19.1. The coexistence manager is radio access technology (RAT) independent and is generally focused upon the coordination of spectrum usage among IEEE-based technologies over transmission control protocol (TCP)/Internet Protocol (IP) interfaces. As a result of its RAT independence, the coexistence manager is a scalable solution and can correspondingly interwork with a number of different systems. As such, the coexistence manager may serve as a relatively high level coordinator that may facilitate the negotiation between RATs regarding spectrum utilization or may govern the spectrum utilization for the shared spectrum locally. A coexistence manager may operate in a relatively large time scale, that is, the reaction time of the coexistence manager to interference issues between systems is substantially greater than the time quantities of the physical layers of the systems. It may therefore be desirable to provide for smaller time scale coordination between the systems that are being coordinated by the coexistence manager.

From the long-term evolution (LTE) perspective, LTE access points, such as evolved Node Bs (eNBs), may operate in the unlicensed spectrum. As a result of their capability to manage deployment bandwidth and the number of utilized carriers and to permit flexible reconfiguration of the center frequency, LTE may offer advantages for operation within the unlicensed spectrum relative to compliance with IEEE 802.11 standards.

LTE supports radio access network sharing as a result of its support for multi-to-multirelationships between evolved universal mobile telecommunications system (UMTS) terrestrial radio access network (E-UTRAN) nodes and evolved packet core (EPC) nodes. In this regard, the network sharing architecture supported by LTE allows different core network operators to connect to a shared radio access network. The operators not only share the radio network elements, but may also share the radio resources themselves. In addition to the shared radio access network, the operators may optionally have additional dedicated radio access networks, such as a second generation (2G) radio access network.

As a result of the advantages offered by LTE systems and the operability of LTE access points within the unlicensed spectrum, it may be desirable to improve the coordination between LTE systems, such as the smaller time scale coordination between the LTE systems, in order to leverage those advantages. Moreover, it may be desirable to improve the coordination between LTE systems that is provided by a coexistence manager.

BRIEF SUMMARY

A method and apparatus are provided according to example embodiments of the present invention for facilitating the creation of an intra-system interface between systems operating in an unlicensed spectrum. As such, the intra-system interface may permit the systems operating within the unlicensed spectrum to use the same radio resources in a coordinated fashion. In one embodiment, for example, a coexistence manager may facilitate the creation of an intra-system interface between first and second LTE systems that use the same radio resources within an unlicensed spectrum, such as within the TV white spaces. By facilitating the usage of the unlicensed spectrum by systems, such as LTE or other systems, the data traffic that is required to be supported by the core network within the licensed spectrum may be advantageously reduced.

In one embodiment, a method is provided that includes causing configuration messages to be sent to first and second systems regarding creation of an intra-system interface. The first and second systems use the same radio resources. Additionally, the first and second systems operate in an unlicensed spectrum. The method of this embodiment also receives configuration message responses from the first and second systems including address information for first and second access points of the first and second systems, respectively. The method additionally causes a message to be sent to the first system to trigger the first system to initiate establishment of the intra-system interface with the second access point of the second system. In this regard, the message that triggers the first system to initiate establishment of the intra-system interface includes the address information for the second access point of the second system.

In another embodiment, and apparatus is provided that includes at least one processor and at least one memory including computer program code with the at least one memory and the computer program code being configured to, with the at least one processor, cause the apparatus at least to cause configuration messages to be sent to first and second systems regarding creation of an intra-system interface. The first and second systems use the same radio resources. Additionally, the first and second systems operate in an unlicensed spectrum. The at least one memory and the computer program code of this embodiment are further configured to, with the at least one processor, cause the apparatus to receive configuration message responses from the first and second systems including address information for first and second access points of the first and second systems, respectively, and to cause a message to be sent to the first system to trigger the first system to initiate establishment of the intra-system interface with the second access point of the second system. In this regard, the message that triggers the first system to initiate establishment of the intra-system interface includes the address information for the second access point of the second system.

In a further embodiment, a computer program product is provided that includes at least one non-transitory computer-readable storage medium having computer-readable program instructions stored therein with the computer-readable program instructions including program instructions configured to cause configuration messages to be sent to first and second systems regarding creation of an intra-system interface. The first and second systems use the same radio resources. Additionally, the first and second systems operate in an unlicensed spectrum. The computer-readable program instructions of this embodiment also include program instructions configured to receive configuration message responses from the first and second systems including address information for first and second access points of the first and second systems, respectively. The computer-readable program instructions additionally include program instructions configured to cause a message to be sent to the first system to trigger the first system to initiate establishment of the intra-system interface with the second access point of the second system. In this regard, the message that triggers the first system to initiate establishment of the intra-system interface includes the address information for the second access point of the second system.

In yet another embodiment, an apparatus is provided that includes means for causing configuration messages to be sent to first and second systems, respectively, regarding creation of an intra-system interface. The first and second systems use the same radio resources. Additionally, the first and second systems operate in an unlicensed spectrum. The apparatus of this embodiment also includes means for receiving configuration message responses from the first and second systems including address information for first and second access points, respectively. The apparatus additionally includes means for causing a message to be sent to the first system to trigger the first system to initiate establishment of the intra-system interface with the second access point of the second system. In this regard, the message that triggers the first system to initiate establishment of the intra-system interface includes the address information for the second access point of the second system.

In one embodiment, a method is provided that includes receiving a configuration message regarding creation of an intra-system interface between first and second access points of first and second systems, respectively. The first and second systems use the same radio resources. Additionally, the first and second systems operate in an unlicensed spectrum. The method of this embodiment also causes a configuration message response to be sent to a coexistence manager including address information for the first access point of the first system. The method additionally receives a message to trigger establishment of the intra-system interface. The message that triggers establishment of the intra-system interface includes the address information for the second access point of the second system.

In another embodiment, an apparatus is provided that includes at least one processor and at least one memory including computer program code with the at least one memory and the computer program code being configured to, with the at least one processor, cause the apparatus at least to receive a configuration message regarding creation of an intra-system interface between first and second access points of first and second systems, respectively. The first and second systems use the same radio resources. Additionally, the first and second systems operate in an unlicensed spectrum. The at least one memory and the computer program code of this embodiment are further configured to, with the at least one processor, cause the apparatus to cause a configuration message response to be sent to a coexistence manager including address information for the first access point of the first system and to receive a message to trigger establishment of the intra-system interface. The message that triggers establishment of the intra-system interface includes the address information for the second access point of the second system.

In a further embodiment, a computer program product is provided that includes at least one non-transitory computer-readable storage medium having computer-readable program instructions stored therein with the computer-readable program instructions including program instructions configured to receive a configuration message regarding creation of an intra-system interface between first and second access points of first and second systems, respectively. The first and second systems use the same radio resources. Additionally, the first and second systems operate in an unlicensed spectrum. The computer-readable program instructions of this embodiment also include program instructions configured to cause a configuration message response to be sent to a coexistence manager including address information for the first access point of the first system. The computer-readable program instructions of this embodiment additionally include program instructions configured to receive a message to trigger establishment of the intra-system interface. The message that triggers establishment of the intra-system interface includes the address information for the second access point of the second system.

In yet another embodiment, an apparatus is provided that includes means for receiving a configuration message regarding creation of an intra-system interface between first and second access points of first and second systems, respectively. The first and second systems use the same radio resources. Additionally, the first and second systems operate in an unlicensed spectrum. The apparatus of this embodiment also includes means for causing a configuration message response to be sent to a coexistence manager including address information for the first access point of the first system. The apparatus additionally includes means for receiving a message to trigger establishment of the intra-system interface. The message that triggers establishment of the intra-system interface includes the address information for the second access point of the second system.

BRIEF DESCRIPTION OF THE DRAWINGS

Having thus described certain example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

A method and apparatus are provided for facilitating the creation of an intra-system interface to allow two or more systems, such as LTE systems, that use the same radio resources to operate in an unlicensed spectrum in a coordinated fashion. By coordinating usage of the radio resources within the unlicensed spectrum, the method and apparatus of example embodiments of the present invention may provide for smaller time scale coordination between the systems. By facilitating the usage of the unlicensed spectrum by systems, such as LTE systems, the method and apparatus of one embodiment may advantageously reduce the data traffic that is required to be supported by the core network within the licensed spectrum. While an intra-system interface may be established between LTE systems as noted above and as will be described for purposes of example, the method and apparatus of other embodiments may establish an intra-system interface to coordinate the use of radio resources within the unlicensed spectrum by other types of systems including, without limitation, systems that utilize a wired interface, Inter Access Point Protocol (IAPP) or a wireless interface using, for example, Public Action Frames on certain channels between wireless local area network (WLAN) access points.

Figure 1:
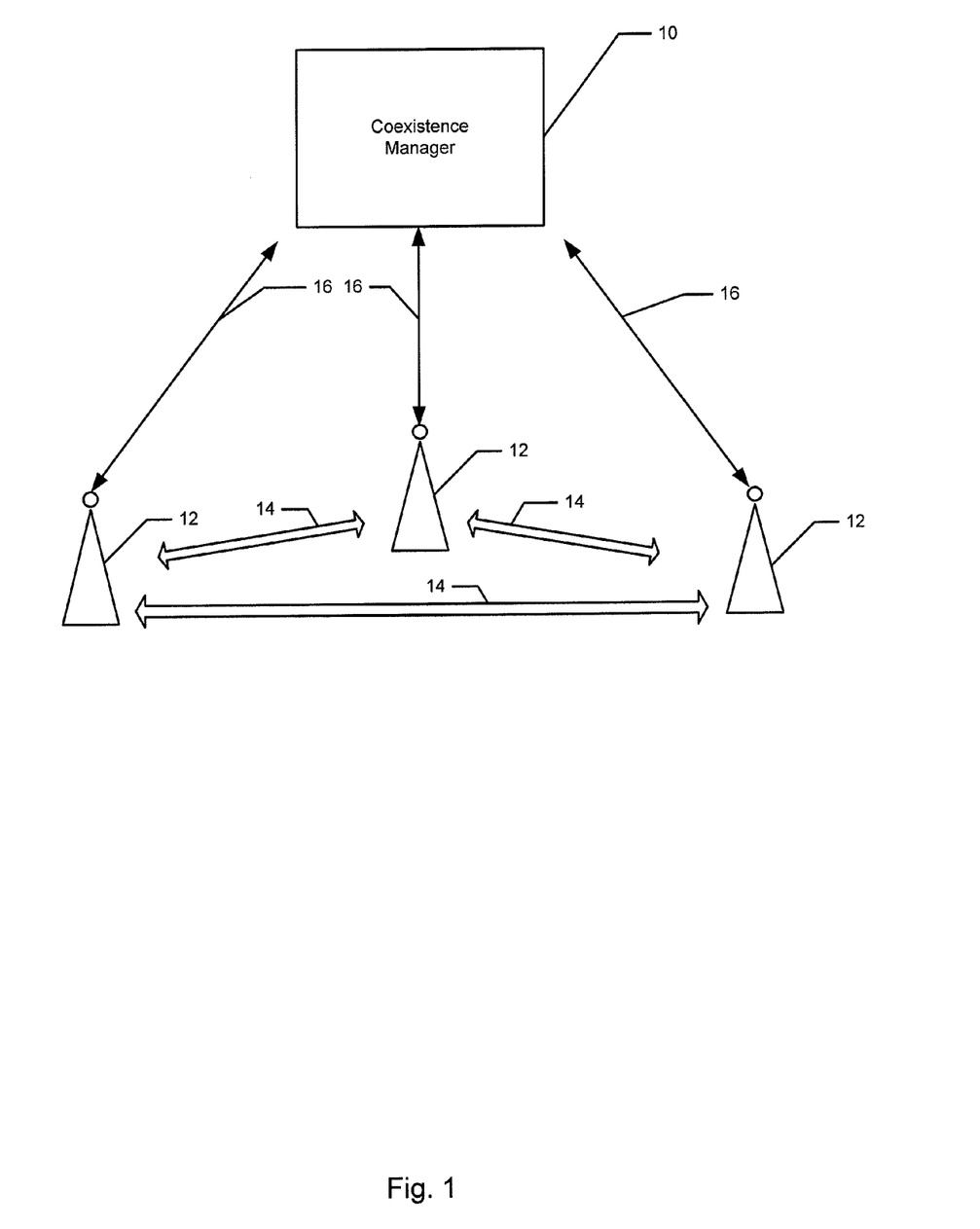
FIG. 1 is a schematic representation of a system including a coexistence manager and a plurality of access points for two or more different systems in accordance with an example embodiment of the present invention.

Although the method and apparatus may be implemented in a variety of different systems, one example of such a system is shown in FIG. 1, which includes a coexistence manager 10, such as described in general by IEEE 802.19.1. The coexistence manager operates on top of the radio access technologies (RATs) and is RAT independent. The coexistence manager coordinates spectrum usage, such as usage of an unlicensed spectrum, e.g., the TV white spaces, between different systems that may access or utilize the unlicensed spectrum and, indeed, may use the same radio resources.

In addition to the coexistence manager 10, the system of FIG. 1 includes a plurality of access points 12, such as base stations, node Bs (NBs), evolved node Bs (eNBs) or the like. As described above, the access points may be elements of different systems. For example, the access points may be eNBs that are elements of different LTE systems, such as independent LTE systems. Nonetheless, the access points may be relatively closely located such that the interference regions of the access points at least partially overlap.

Within the licensed spectrum, access points may be interconnected with one another by respective X2 interfaces and with a core network by respective S1 interfaces. For example, the eNBs of different LTE systems may be inter-connected to each other by an X2 interface and to the evolved packet core by an S1 interface. In particular, the eNBs may be connected to a mobility management entity (MME) by means of an S1-MME interface and to a serving gateway (S-GW) by an S1-U interface. The X2 interface between neighboring eNBs may be utilized to exchange signaling information, such as load or interference related information or handover related information. However, within the unlicensed spectrum, the eNBs are not inter-connected in this manner. As such, methods and apparatus are provided in accordance with an example embodiment of the present invention in order to facilitate the establishment of an intra-system interface between access points 12 of two different systems that use the same radio resources within an unlicensed spectrum. For example, the method and apparatus may facilitate the creation of an intra-system interface between eNBs of different LTE systems that utilize the same radio resources within an unlicensed spectrum, such as within the TV white spaces.

Figure 2:
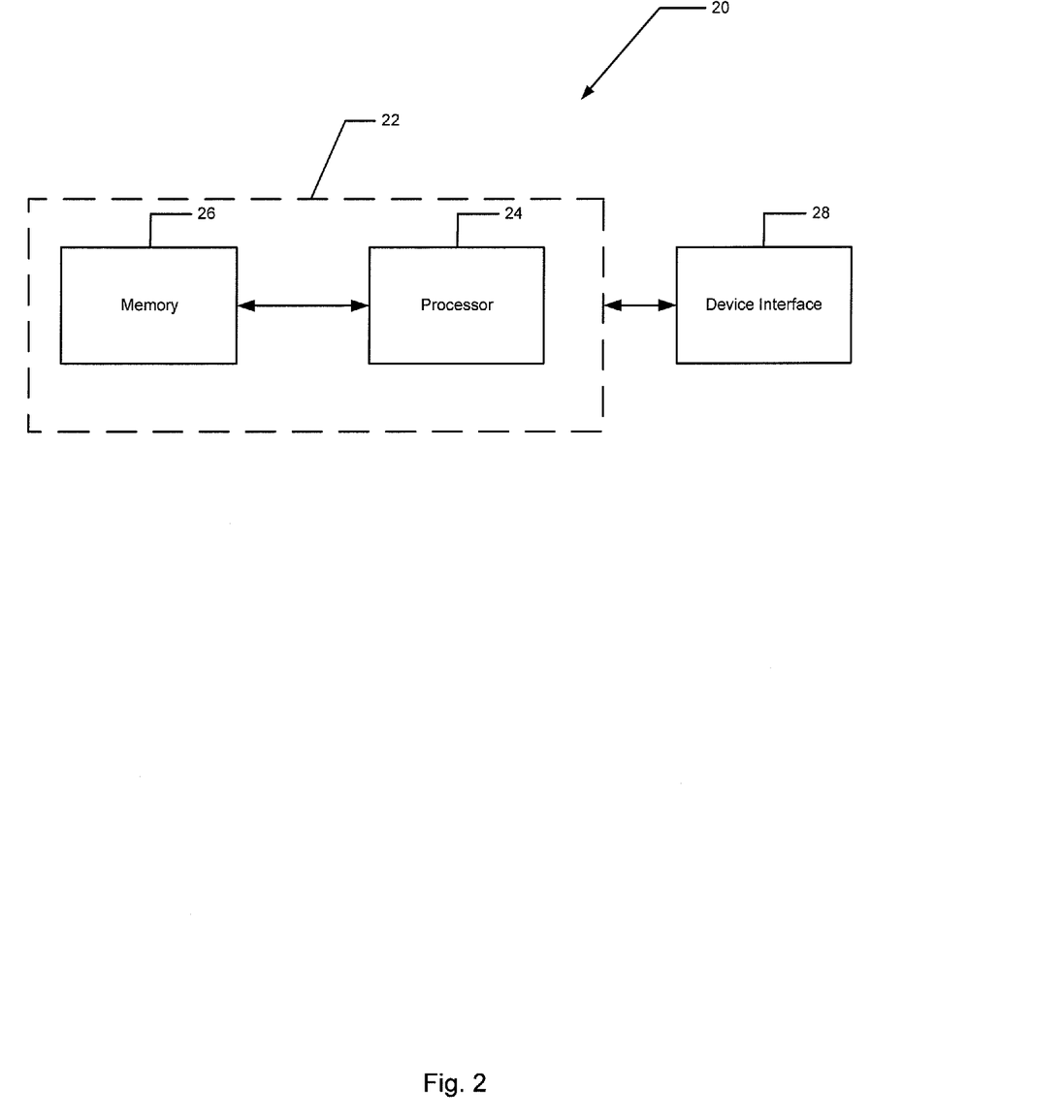
FIG. 2 is a block diagram of an apparatus for facilitating establishment of an intra-system interface between systems operating in an unlicensed spectrum in accordance with an embodiment to the present invention.

In one embodiment, for example, the coexistence manager 10 and/or the MMEs of the different systems may each be embodied as or otherwise include an apparatus 20 as generically represented by the block diagram of FIG. 2. It should be noted, however, that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include one or more processors 24 and one or more memories 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the coexistence manager 10 and/or the access points 12, the processing circuitry may be embodied as a portion of the coexistence manager and/or access points.

The device interface 28 may include one or more interface mechanisms for enabling communication with other devices and/or networks. In an instance in which the apparatus 20 is embodied by a coexistence manager 10, the device interface may enable communication with the access points 12, while in an instance in which the apparatus is embodied by an access point, the device interface may enable communication with the coexistence manager and/or other access point(s). In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
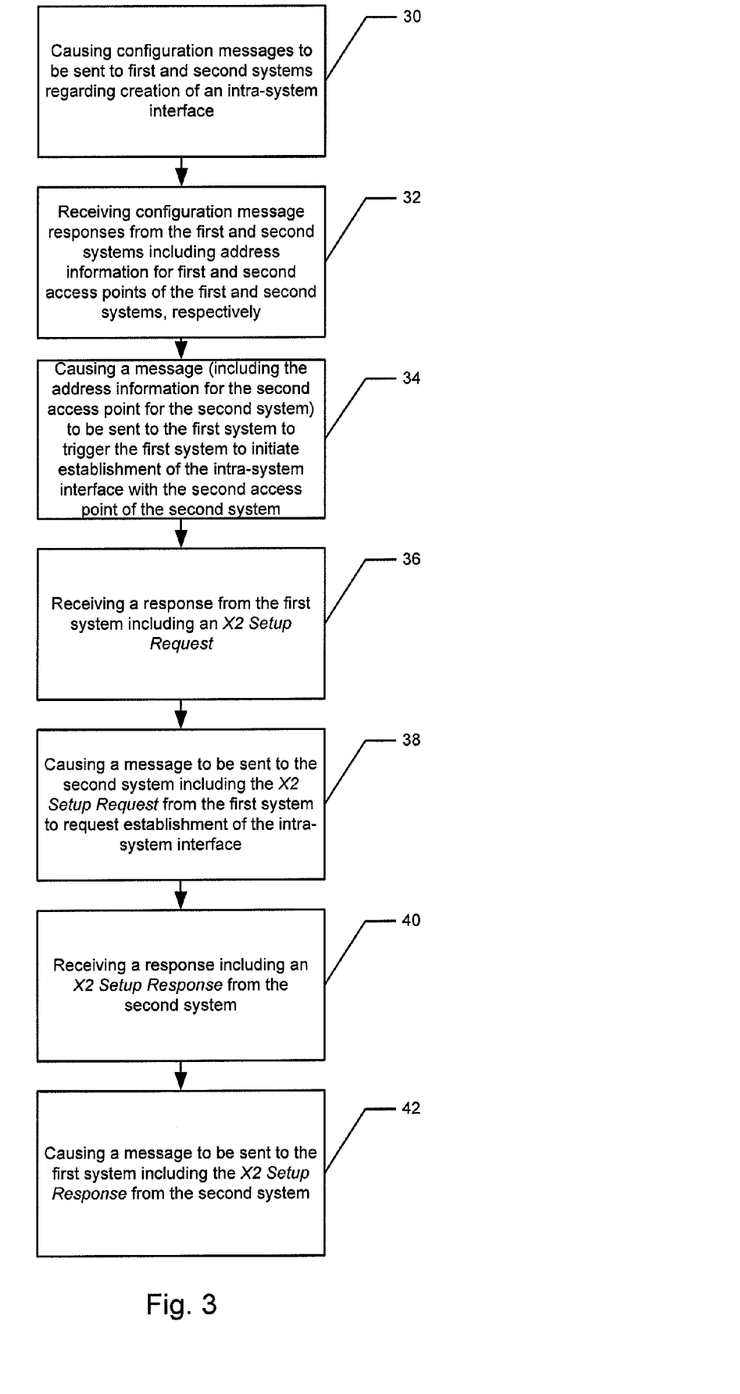
FIG. 3 is a flow chart illustrating operations performed from the perspective of the coexistence manager in accordance with one embodiment of the present invention.
Figure 6:
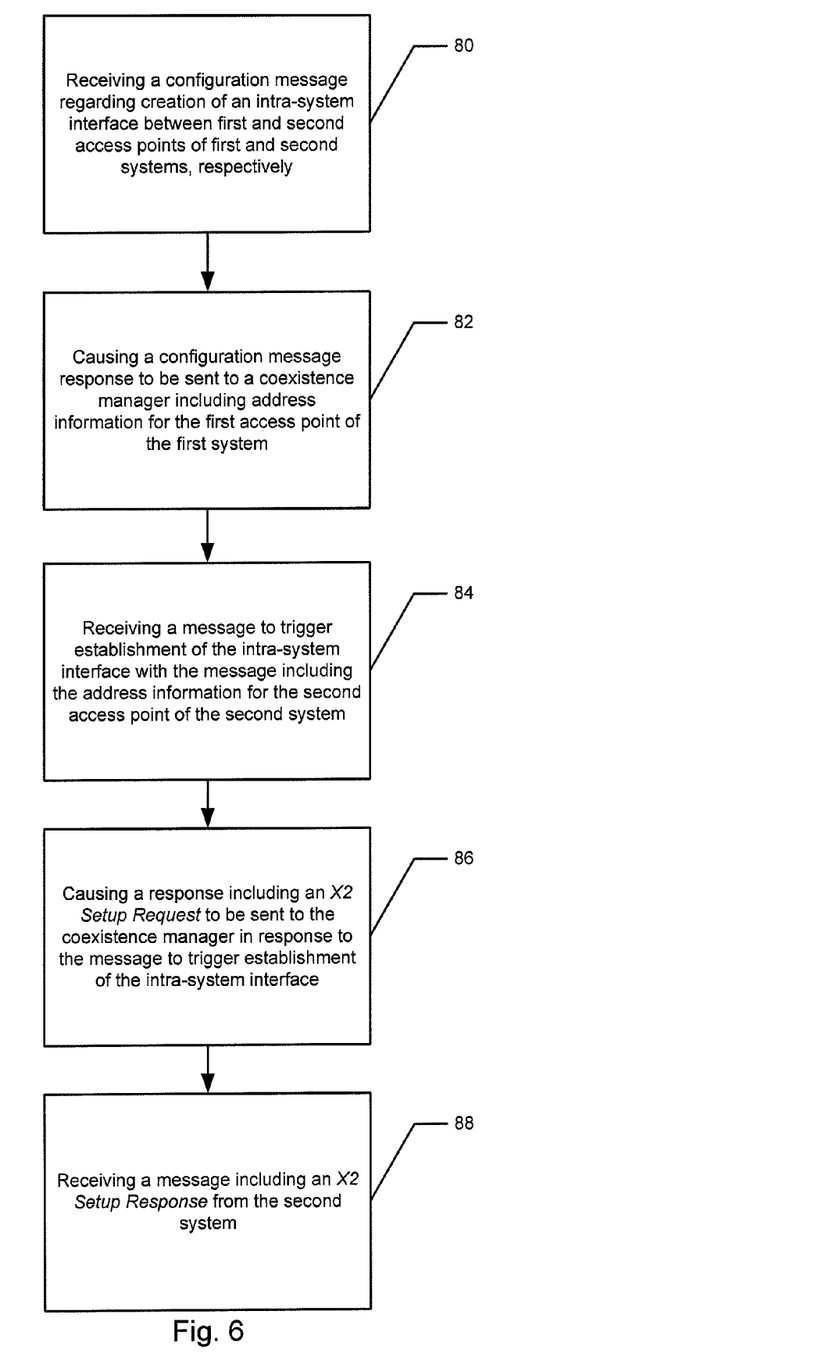
FIG. 6 is a flow chart illustrating operations performed from the perspective of a system, such as a mobility management entity (MME), in accordance with one embodiment of the present invention.

Referring now to FIGS. 3 and 6, flowcharts illustrating the operations performed by a method, apparatus and computer program product, such as apparatus 20 of FIG. 2, in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 6, when executed, convert a computer or processing circuitry into a particular machine configured to perform an example embodiment of the present invention. Accordingly, the operations of each of FIGS. 3 and 6 define an algorithm for configuring a computer or processing circuitry, e.g., processor 24, to perform an example embodiment. In some cases, a general purpose computer may be provided with an instance of the processor which performs the algorithm of a respective one of FIGS. 3 and 6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

As shown in FIG. 3, an apparatus 20 embodied by coexistence manager 10 or other network entity may exchange messages with two or more different systems, such as two or more LTE systems, in order to create an intra-system interface therebetween. The resulting intra-system interface may permit the systems operating within the unlicensed spectrum to use the same radio resources in a coordinated fashion. In one embodiment that is described below for purposes of example but not of limitation, a coexistence manager may facilitate the creation of an intra-system interface between respective access points 12 of first and second LTE systems that use the same radio resources within an unlicensed spectrum, such as within the TV white spaces, thereby potentially advantageously reducing the data traffic that is required to be supported by the core network within the licensed spectrum.

As shown in operation 30 of FIG. 3, the apparatus 20 embodied by a coexistence manager 10 may includes means, such as the processing circuitry 22, the processor 24, the device interface 28 or the like, for causing configuration messages to be sent to first and second systems regarding creation of an intra-system interface. Although FIG. 3 (as well as FIG. 4 discussed below) illustrates the exchange of messages between a coexistence manager and two different systems, the configuration manager may exchange messages with three or more systems in other embodiments. The first and second systems may be configured to operate in an unlicensed spectrum, such as within TV white spaces. Additionally, the radio resources used by the first and second systems may be the same, that is, the radio resources used by the first and second systems may be in common. By creating an intra-system interface between the access points of the different systems, the usage of these same radio resources within the unlicensed spectrum by the independent systems may be coordinated including the provision of smaller time scale coordination between the systems.

Figure 4:
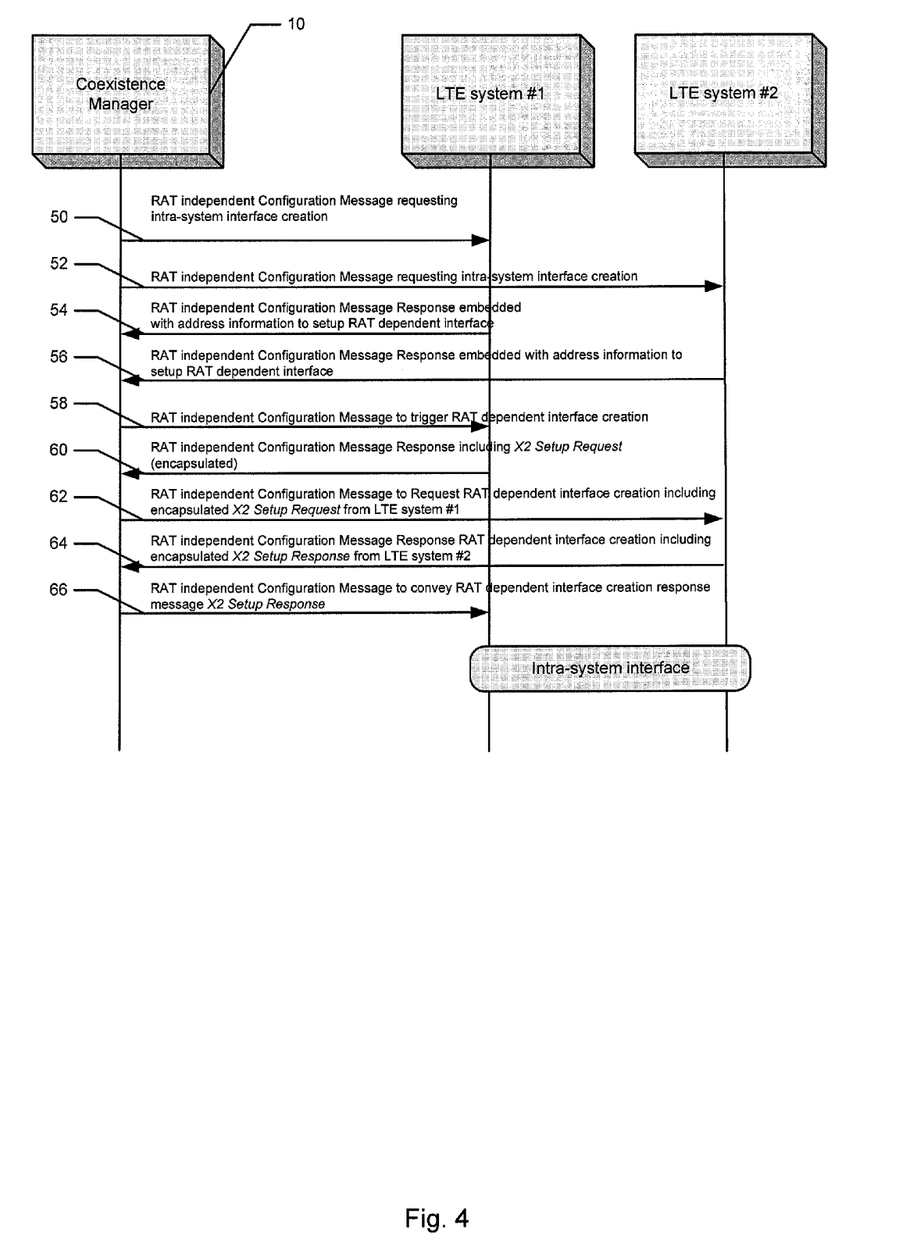
FIG. 4 is a signaling flow diagram in accordance with one embodiment of the present invention.

By way of example of the configuration messages sent to the first and second systems, respectively, signals 50 and 52 of FIG. 4 illustrate configuration messages requesting intra-system interface creation that are sent by the coexistence manager 10 to LTE system #1 and LTE system #2. As noted by FIG. 4, these configuration messages are independent of the radio access technology. As used herein, the exchange of messages between the coexistence manager and the first and second systems may be conducted between the coexistence manager and the respective MMEs of the first and second systems. As such, reference herein to the first and second systems, such as LTE system #1 and LTE system #2, is made in a general sense so as to include not only the first and second systems, but to also more particularly include the respective MMEs of the various systems, such as the MMEs of LTE system #1 and LTE system #2.

The apparatus 20 embodied by the coexistence manager 10 or other network entity may also include means, such as the processing circuitry 22, the processor 24, the device interface 28 or the like, for receiving configuration message responses from the first and second systems, including address information for first and second access points 12 of the first and second systems, respectively. See operation 32 of FIG. 3. Although the address information may be provided in various manners, the address information of one embodiment is a TCP/IP address providing, for example, a port and IP address of the respective access point. With reference to the example of FIG. 4, configuration message responses 54 and 56 including embedded address information may be provided by LTE system #1 and LTE system #2 to the coexistence manager in order to set up an intra-system interface. Although the intra-system interface that is to be created is or will be RAT dependent, the configuration message responses provided by the access points of the different systems are also independent of the radio access technology.

The apparatus 20 embodied by the coexistence manager 10 or other network entity may also include means, such as the processing circuitry 22, the processor, 24, the device interface 28 or the like, for causing a message to be sent to the first system to trigger the first system to initiate establishment of the intra-system interface with the access points of the other systems, such as the second access point of the second system. See operation 34 of FIG. 3. In this regard, the coexistence manager may identify any one of the systems to initiate establishment of the intra-system interface. In the example of FIG. 4, the coexistence manager identifies LTE system #1 to initiate the establishment of the intra-system interface with the access point of LTE system #2. As such, the coexistence manager of the example embodiment of FIG. 4 causes a configuration message 58 to be sent to LTE system #1 to trigger LTE #1 to initiate the establishment of the intra-system interface. As indicated above, the configuration message may be RAT independent, while the intra-system interface that will be created is RAT dependent. The message that is sent by the coexistence manager to the first system to trigger the first system to initiate the establishment of the intra-system interface may include address information for the second access point of the second system and, in instances in which the intra-system interface is to be established with additional access points of other systems, the address information for the additional access points of the other systems. The address information may be provided in various manners, such as a TCP/IP address, e.g., a port and IP address, of the respective access point(s).

In one embodiment, the different systems, such as the MMEs of the different systems, may then communicate with one another in order to establish the intra-system interface therebetween. Once established, the apparatus 20 embodied by the coexistence manager 10 or other network entity may include means, such as the processing circuitry 22, the processor 24, the device interface 28 or the like, for receiving information regarding the intra-system interface established between the access points of the different systems. While any of the systems may provide the information regarding the resulting intra-system interface to the coexistence manager, the coexistence manager may receive the information regarding the intra-system interface from the first system in one embodiment.

In another embodiment illustrated, for example, in FIGS. 3 and 4, the coexistence manager 10 or other network entity may continue to exchange messages with the different systems in order to establish the intra-system interface. In this regard, the apparatus 20 embodied by the coexistence manager or other network entity may include means, such as the processing circuitry 22, the processor 24, the device interface 28 or the like, for receiving, in response to the message to trigger the first system to initiate establishment of the intra-system interface, a response from the first system including an X2 setup request. See operation 36 of FIG. 3. As shown in FIG. 4, for example, the coexistence manager may receive a configuration message response 60 including an X2 setup request from LTE system #1. The X2 setup request may be encapsulated within the configuration message response. As noted above, the configuration message response may be RAT independent. As used herein, X2 refers to an interface, that is, an X2 interface, between access points of different systems operating within the unlicensed spectrum including, but not limited to, an interface between eNBs of different LTE systems.

The apparatus 20 embodied by the coexistence manager 10 or other network entity may also includes means, such as the processing circuitry 22, the processor 24, the device interface 28 or the like, for causing a message to be sent to the other systems, such as the second system, including the X2 setup request that was received from the first system to request establishment of the intra-system interface. See operation 38 of FIG. 3. As shown in the example of FIG. 4, the coexistence manager may send a configuration message 62 to LTE system #2 to request the creation of the intra-system interface with the configuration message including an X2 setup request that was received from LTE system #1. In this regard, the X2 setup request may be encapsulated within the configuration message. Additionally, the configuration message may be RAT independent, although the intra-system interface that is to be created may be RAT dependent.

The apparatus 20 embodied by the coexistence manager 30 or other network entity may also include means, such as the processing circuitry 22, the processor 24, the device interface 28 or the like, for receiving, in response to the message to the other systems to request establishment of the intra-system interface, a response including an X2 setup response from the other systems, such as from the second system. See operation 40 of FIG. 3. With reference to FIG. 4, for example, a configuration message response 64 including an X2 setup response may be received by the coexistence manager from LTE system #2. In this regard, the X2 setup response may be encapsulated within configuration message response. As before, the configuration message response may be RAT independent although the intra-system interface that is to be created may be RAT dependent. The apparatus embodied by the coexistence manager or other network entity may also include means, such as the processing circuitry, the processor, the device interface or the like, for causing a message to be sent to the first system including the X2 setup response from the other systems, such as from the second system. See operation 42 of FIG. 3. As shown in the example of FIG. 4, the coexistence manager may send a configuration message 66 to LTE system #1 that includes the X2 setup response that was received from LTE system #2. This configuration message may be RAT independent, while the intra-system interface that is to be created may be RAT dependent.

Following the exchange of the X2 setup request and X2 setup response between the different systems, such as LTE system #1 and LTE system #2, as facilitated by the coexistence manager 10 or other network entity, the intra-system interface may be established between respective access points 12 of the different systems, such as an X2 interface. Among other functions, the intra-system interface may provide for small time scale coordination between the systems so as to coordinate usage of the same radio resources within an unlicensed spectrum, such as within TV white spaces. For example, LTE systems may include several inter-cell interference coordination (ICIC) schemes for intra-system co-existence which may provide for improved performance in comparison to co-existing with other RATs within the same geographical area. By providing for coordination between similar types of systems, such as LTE systems, within the same channel(s), the small scale co-existence operations converge to intra-system co-existence issues instead of inter-system co-existence issues with the intra-system co-existence issues being solved in the manner specified by each type of system, such as by ICIC schemes for LTE systems.

In an embodiment in which the intra-system interface that is created is an X2 interface, the X2 interface may established in different manners. As shown in FIG. 1, for example, the coexistence manager 10 may establish X2 connections 14 between the access points 12 in the form of peer-to-peer (P2P) connections, such that information may be exchanged between the access points via the P2P connections. Additionally, controlled connections 16 may be maintained or established between the coexistence manager and the access points so as to maintain and manage the X2 connections such as by tearing up and/or establishing X2 connections based upon the need.

Figure 5:
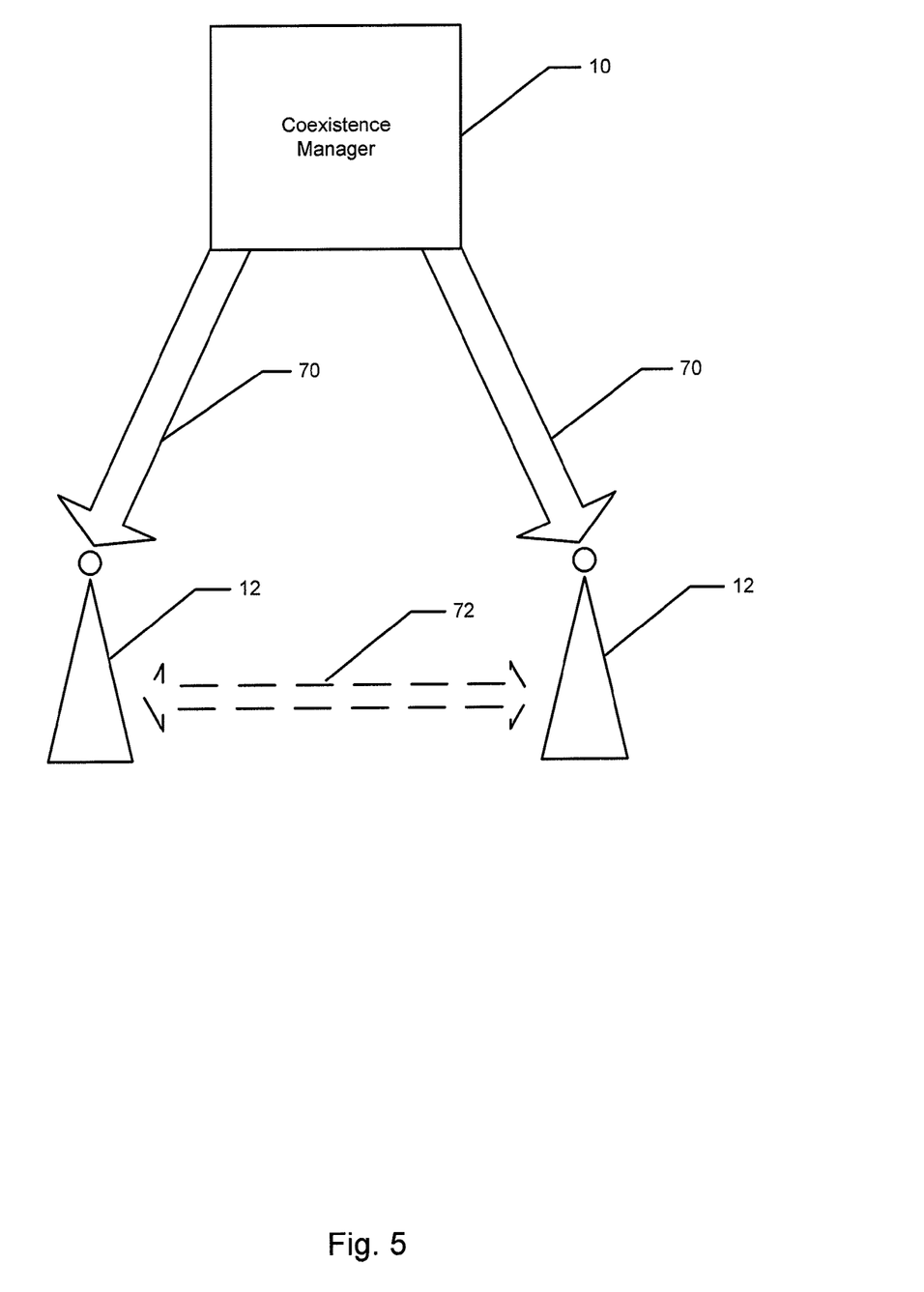
FIG. 5 is a schematic representation of a system including a coexistence manager and a plurality of access points of different systems in accordance with another embodiment of the present invention.

However, the intra-system interface may be established in other manners. As shown in FIG. 5, for example, the coexistence manager 10 may define a virtual X2 interface 52 between the access points 12 of the different systems. In this regard, the virtual X2 interface may be mapped to an X2 tunnel 70 maintained by the coexistence manager. The X2 tunnel may be utilized to route X2 traffic via the coexistence manager between the access points of the different systems such that it appears that a virtual X2 interface exists between the access points even though the traffic is actually routed via the X2 tunnel maintained by the coexistence manager. The coexistence manager of this embodiment may manage and maintain the tunnel between the access points. Once the tunnel is no longer required, the coexistence manager may unmap the tunnel and the virtual interface. In one embodiment, an access point may have multiple virtual X2 interfaces with the same or different access points of other systems.

Reference is now made to FIG. 6 which sets forth the operations from the perspective of one of the systems, such as a first LTE system and, more particularly, an MME of the first LTE system, that is to initiate establishment of the intra-system interface. In this regard, an apparatus 20 embodied by an MME may include means, such as the processing circuitry 22, the processor 24, the device interface 28 or the like, for receiving a configuration message regarding creation of a intra-system interface between the first access point of the first system and another access point of another system. See operation 80 of FIG. 6 as well as the configuration message 50 received by LTE system #1 in FIG. 4. The apparatus embodied by the MME of this embodiment may also include means, such as a processing circuitry, the processor, the device interface or the like, for causing a configuration message response to be sent to the coexistence manager. See operation 82 of FIG. 6 as well as the configuration message response 54 provided by LTE system #1 in FIG. 4. The configuration message response may include address information for the first access point of the first system, such as the TCP/IP address, e.g., port and IP address, of the first access point.

The apparatus 20 embodied by the MME of this embodiment may also include means, such as the processing circuitry 22, the processor 24, the device interface 28 or the like, for receiving a message to trigger establishment of the intra-system interface. In this regard, the message includes the address information for the access points of the other systems, such as the address information for the second access point of the second system. See operation 84 of FIG. 6 as well as the configuration message 58 provided by the coexistence manager 10 to LTE system #1 in FIG. 4. In one embodiment, the first system, such as the MME of the first system, may then exchange messages with the other systems, such as the MMEs of the other systems, in order to establish an intra-system interface between the respective access points. In this embodiment, the apparatus embodied by the MME may include means, such as the processing circuitry, the processor, the device interface or the like, for causing a message that provides information regarding the intra-system interface that has been established to be provided to the coexistence manager 10.

In another embodiment in which the coexistence manager 10 further facilitates the establishment of the intra-system interface, the apparatus 20 embodied by the MME may include means, such as the processing circuitry 22, the processor 24, the device interface 28 or the like, for causing a response including an X2 setup request to be sent to the coexistence manager in response to the message to trigger establishment of the intra-system interface. See operation 66 of FIG. 6 and, for example, the configuration message response 60 including the X2 setup request of FIG. 4. As noted above, the X2 setup request may be encapsulated.

The apparatus 20 embodied by the MME of this embodiment may also include means, such as the processing circuitry 22, the processor 24, the device interface 28 or the like, for receiving a message from the coexistence manager 10 including an X2 setup response that was previously received by the coexistence manager from the other systems, such as the MME of the second system. See operation 68 of FIG. 6 as well as the configuration message response 66 including the X2 setup response from the coexistence manager in FIG. 4. Based upon the exchange of messages, including the exchange of X2 setup requests and responses, the MME of the first system may establish an intra-system interface between the access points of the plurality of systems, such as described above in conjunction with the embodiments of FIGS. 1 and 5, for example.

Many modifications and other embodiments of the inventions set forth herein will come to mind to one skilled in the art to which these inventions pertain having the benefit of the teachings presented in the foregoing descriptions and the associated drawings. For example, while an intra-system interface may be established between LTE systems as described above, the method and apparatus of other embodiments may establish an intra-system interface to coordinate the use of radio resources within the unlicensed spectrum by other types of systems including, without limitation, systems that utilize a wired interface, Inter Access Point Protocol (IAPP) or a wireless interface using, for example, Public Action Frames on certain channels between WLAN access points. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   causing configuration messages to be sent to first and second systems regarding creation of an intra-system interface, wherein radio resources used by the first and second systems are in common, and wherein the first and second systems operate in an unlicensed spectrum;
   receiving configuration message responses from the first and second systems including address information for first and second access points of the first and second systems, respectively;
   causing a message to be sent to the first system to trigger the first system to initiate establishment of the intra-system interface with the second access point of the second system, wherein the message includes the address information for the second access point of the second system; and
   causing establishment of the intra-system interface between respective access points of the first system and the second system in response to an exchange of setup requests and setup responses between the first system and the second system.

2. A method according to claim 1 further comprising receiving information regarding the intra-system interface established between the first and second access points of the first and second systems, respectively.

3. A method according to claim 1 further comprising receiving, in response to the message to trigger the first system to initiate establishment of the intra-system interface, a response from the first system including an X2 setup request.

4. A method according to claim 3 further comprising causing a message to be sent to the second system including the X2 setup request from the first system to request establishment of the intra-system interface.

5. A method according to claim 4 further comprising receiving, in response to the message to the second system to request establishment of the intra-system interface, a response including an X2 setup response from the second system.

6. A method according to claim 5 further comprising causing a message to be sent to the first system including the X2 setup response from the second system.

7. An apparatus comprising:
   at least one processor; and
   at least one memory including computer program code,
   the at least one memory and the computer program code configured to, with the at least one processor, cause the apparatus at least to:
   cause configuration messages to be sent to first and second systems regarding creation of an intra-system interface, wherein radio resources used by the first and second systems are in common, and wherein the first and second systems operate in an unlicensed spectrum;
   receive configuration message responses from the first and second systems including address information for first and second access points of the first and second systems, respectively;
   cause a message to be sent to the first system to trigger the first system to initiate establishment of the intra-system interface with the second access point of the second system, wherein the message includes the address information for the second access point of the second system; and
   cause establishment of the intra-system interface between respective access points of the first system and the second system in response to an exchange of setup requests and setup responses between the first system and the second system.

8. An apparatus according to claim 7 wherein the at least one memory and the computer program code are further configured to, with the at least one processor, cause the apparatus to receive information regarding the intra-system interface established between the first and second access points of the first and second systems, respectively.

9. An apparatus according to claim 7 wherein the at least one memory and the computer program code are further configured to, with the at least one processor, cause the apparatus to receive, in response to the message to trigger the first system to initiate establishment of the intra-system interface, a response from the first system including an X2 setup request.

10. An apparatus according to claim 9 wherein the at least one memory and the computer program code are further configured to, with the at least one processor, cause the apparatus to cause a message to be sent to the second system including the X2 setup request from the first system to request establishment of the intra-system interface.

11. An apparatus according to claim 10 wherein the at least one memory and the computer program code are further configured to, with the at least one processor, cause the apparatus to receive, in response to the message to the second system to request establishment of the intra-system interface, a response including an X2 setup response from the second system.

12. An apparatus according to claim 11 wherein the at least one memory and the computer program code are further configured to, with the at least one processor, cause the apparatus to cause a message to be sent to the first system including the X2 setup response from the second system.

13. A method comprising:
receiving a configuration message regarding creation of an intra-system interface between first and second access points of first and second systems, respectively, wherein radio resources used by the first and second systems are in common, and wherein the first and second systems operate in an unlicensed spectrum;
causing a configuration message response to be sent to a coexistence manager including address information for the first access point of the first system; and
receiving a message to trigger establishment of the intra-system interface, wherein the message includes the address information for the second access point of the second system,
wherein establishment of the intra-system interface between respective access points of the first system and the second system is caused by the coexistence manager in response to an exchange of setup requests and setup responses between the first system and the second system.

14. A method according to claim 13 further comprising causing a message that provides information regarding the intra-system interface established between the first and second access points of the first and second systems, respectively, to be sent to the coexistence manager.

15. A method according to claim 13 further comprising causing a response including an X2 setup request to be sent to the coexistence manager in response to the message to trigger establishment of the intra-system interface.

16. A method according to claim 15 further comprising receiving a message including an X2 setup response from the second system.

17. An apparatus comprising:
at least one processor; and
at least one memory including computer program code,
the at least one memory and the computer program code configured to, with the at least one processor, cause the apparatus at least to:
receive a configuration message regarding creation of an intra-system interface between first and second access points of first and second systems, respectively, wherein radio resources used by the first and second systems are in common, and wherein the first and second systems operate in an unlicensed spectrum;
cause a configuration message response to be sent to a coexistence manager including address information for the first access point of the first system; and
receive a message to trigger establishment of the intra-system interface, wherein the message includes the address information for the second access point of the second system,
wherein establishment of the intra-system interface between respective access points of the first system and the second system is caused by the coexistence manager in response to an exchange of setup requests and setup responses between the first system and the second system.

18. An apparatus according to claim 17 wherein the at least one memory and the computer program code are further configured to, with the at least one processor, cause the apparatus to cause a message that provides information regarding the intra-system interface established between the first and second access points of the first and second systems, respectively, to be sent to the coexistence manager.

19. An apparatus according to claim 17 wherein the at least one memory and the computer program code are further configured to, with the at least one processor, cause the apparatus to cause a response including an X2 setup request to be sent to the coexistence manager in response to the message to trigger establishment of the intra-system interface.

20. An apparatus according to claim 19 wherein the at least one memory and the computer program code are further configured to, with the at least one processor, cause the apparatus to receive a message including an X2 setup response from the second system.

* * * * *